United States Patent
Wang et al.

(10) Patent No.: US 8,200,194 B2
(45) Date of Patent: Jun. 12, 2012

(54) FEMTOCELL NETWORK SYSTEM AND THE DEADZONE EFFECT ALLEVIATING METHOD THEREOF

(75) Inventors: Chuan-Yun Wang, Taipei (TW); Ching-Wen Cheng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 435 days.

(21) Appl. No.: 12/534,093

(22) Filed: Jul. 31, 2009

(65) Prior Publication Data
US 2010/0267365 A1 Oct. 21, 2010

(30) Foreign Application Priority Data
Apr. 20, 2009 (TW) ............................... 98113040 A

(51) Int. Cl.
*H04W 4/00* (2009.01)
(52) U.S. Cl. ................ 455/411; 455/452.2; 455/444; 455/525; 370/338
(58) Field of Classification Search .............. 455/444, 455/525, 452.2, 411; 370/338
See application file for complete search history.

(56) References Cited

U.S. PATENT DOCUMENTS
2007/0097938 A1 5/2007 Nylander et al.
2007/0097939 A1* 5/2007 Nylander et al. ........... 370/338
2008/0304451 A1 12/2008 Thompson
2008/0304462 A1 12/2008 Burgess et al.
2010/0248735 A1* 9/2010 Hamabe et al. ........... 455/452.2

FOREIGN PATENT DOCUMENTS
WO 2007040453 A2 4/2007
WO 2008103084 A1 8/2008

OTHER PUBLICATIONS

3GPP, TS25.331, "Radio Resource Control (RRC); Protocol specification"—(1) Redirect: 8.1.3.4;10.3.3.29; (2) Handover: 8.1.8; 8.1.16; 8.3.5-8.3.11; 10.2.15;10.2.16, 10.2.16a, 10.2.16b, 10.2.16d (3) 8.4.2; 10.2.19 ETSI TS 125 331 V8.6.0(Apr. 2009).
3GPP, TS25.413, "UTRAN Iu interface Radio Access Network Application Part (RANAP) signalling" ETSI TS 125 413 V8.2.1 (Apr. 2009); 8.6.1~8.6.3 , 9.1.10.

(Continued)

*Primary Examiner* — Pierre-Louis Desir
(74) *Attorney, Agent, or Firm* — Lin & Associates IP, Inc.

(57) ABSTRACT

The disclosure provides a Femtocell network system coexistent with a universal mobile telecommunication system (UMTS) network and the deadzone effect alleviating method thereof. For each femto access point (FAP) in the Femtocell network system, a minimum transmission power is pre-configured. When an inadmissible user equipment (UE) performs a location update or a handoff process to obtain the access right to a closed FAP, at least a FAP gateway may estimate the probable existence of deadzone via the UE location update or handoff procedure. Before the inadmissible UE reaches the deadzone of the closed FAP, the transmission power of the closed FAP is decreased repeatedly to allow the inadmissible UE to receive the signals and messages from the UMTS network, until the closed FAP reaches a threshold of its minimum transmission power.

24 Claims, 13 Drawing Sheets

OTHER PUBLICATIONS

3GPP, TS25.214, Physical layer procedures (FDD) ETSI TS 125 214 V8.5.0 (Mar. 2009).

3GPP, TS25.215, Physical layer; Measurements (FDD) ETSI TS 125 215 V8.3.0 (Mar. 2009).

3GPP, TS25.303, Interlayer procedures in Connected Mode ETSI TS 125 303 V8.0.0 (Oct. 2008).

3GPP, TR25.922, Radio resource management strategies ETSI TR 125 922 V7.1.0 (Mar. 2007).

3GPP, TS24.008, Mobile radio interface Layer 3 specification; Core network protocols; Stage 3—9.2.13-9.2.15 ETSI TS 124 008 V8.4.0 (Jan. 2009).

3GPP, TS23.122, Non-Access-Stratum (NAS) functions related to Mobile Station (MS) in idle mode ETSI TS 123 122 V8.4.0 (Jan. 2009).

3GPP, TS23.236, Intra-domain connection of Radio Access Network (RAN) nodes to multiple Core Network (CN) nodes ETSI TS 123 236 V7.0.0 (Jun. 2007).

* cited by examiner

FEMTOCELL NETWORK SYSTEM AND THE DEADZONE EFFECT ALLEVIATING METHOD THEREOF

FIELD OF THE DISCLOSURE

The present disclosure generally relates to a Femtocell network system and the deadzone effect alleviating method thereof.

BACKGROUND OF THE DISCLOSURE

Femtocell network system is designed to provide the wireless communication users with voice and data transmission services of high data rate at low prices. Femto access point (FAP) is a tiny communication base station which provides small service coverage in the indoor environment. Each FAP can be configured as open or closed according to the access authority. The open FAP is configured to allow access from all user equipments (UEs), such as, mobile devices. The closed FAP is configured to allow specific UEs to access, and other UEs without access rights to the FAP are called "inadmissible visiting UEs".

A universal mobile telecommunication system (UMTS) base station (Node B) is a wide area base station which has bigger service coverage than a FAP does. That is, a UMTS base station/Node B may enclose a number of areas served by FAPs. As an inadmissible visiting UE approaches a closed FAP, the signals from the FAP received by the UE may be stronger than that from the UMTS Node B. When the signals from FAP are so strong to overwhelm the signals from UMTS Node B that an inadmissible visiting UE can only receive the signals from the FAP, the inadmissible visiting UE will not be able to access the UMTS Node B. Meanwhile, the closed FAP rejects the access of the inadmissible visiting UE, such that the connection of the UE is thoroughly lost and the communication is interrupted. After the Femtocell network system is deployed, the above-mentioned scenarios will eventually pose the deadzone effect to the inadmissible visiting UEs in the communication environment.

In other words, for inadmissible visiting UEs that are too close to a closed FAP, the UEs can only receive the signals and messages from the closed FAP to which the UEs have no right to access, will lead to a communication deadzone.

FIG. 1 shows a schematic view of the deadzone effect of Femtocell network system. In the upper part of FIG. 1, the y-axis is the received signal code power (RSCP), and the x-axis is the distance between an inadmissible visiting UE (marked as 101) and a FAP (marked as 102). Lines 110 and 120 represent the UE measured RSCPs of FAP and UMTS Node B, respectively. The closer UE 101 approaches to the FAP, the stronger the RSCP of FAP is. In the lower part of FIG. 1, area A1 is referred to as the FAP coverage, where the RSCP of the common pilot channel (CPICH) of FAP is greater than or equal to that of the UMTS Node B. Area A2 is referred to as the FAP dominance, where the CPICH RSCP of the FAP surpasses the CPICH RSCP of UMTS Node B so that UEs in this area are required to perform location update or handoff process to the FAP. Area A3 is referred to as FAP deadzone, which is the area where the FAP signal overwhelms the signal of UMTS Node B that UEs in this area can only detect and receive signals and messages from the FAP.

The UE in area A1 may simultaneously receive signals and messages from the FAP and UMTS Node B. The UE in area A2 may also receive signals and messages from UMTS Node B at the same time, but the signal strength and the quality from FAP dominates those from the UMTS Node B. The UE in area A3 cannot detect or receive any signals from UMTS Node B.

Prior to the present disclosure, two methods are already known in order to handle the Femtocell deadzone effect. The first one is, when the UE enters the deadzone caused by the deployment of a closed FAP, the UE searches for the Global System for Mobile Communications (GSM) base station and performs handoff process to the GSM system to keep the communication. The drawback of this solution is, the UE which handoffs to the GSM system may not be able to access to the services that require high bandwidth as it was in UMTS. The second one is to allocate a different frequency band to Femtocell network system so that UEs in UMTS network shall have less interference from closed FAP. In this manner, the extent of Femtocell deadzone can be greatly decreased. However, this can not entirely eliminate the existence of Femtocell deadzone. In addition, this method will incur an additional cost of using specific 3G frequency band for the Femtocell network operator.

U.S. Patent Publication No. 2007/0097939 disclosed an automatic configuration technique for femto radio base station (Femto Access Point, FAP), proposing that through communication with FAP, macrocell (the UMTS network) may collect the signal quality-related parameters in the FAP coverage and generate parameters related to the FAP transmission power configuration, therefore, minimizing the impact of FAP on macrocell.

SUMMARY OF THE DISCLOSURE

The disclosed embodiments may provide a Femtocell network system and deadzone alleviating method thereof. The Femtocell network system may include a plurality of FAPs and at least a FAP-gateway (FAP-GW), which co-exist with UMTS network in a mobile communication environment.

In an exemplary embodiment of the present disclosure, the disclosed relates to a deadzone alleviating method for Femtocell network system, comprising: for each FAP, pre-configuring a minimum transmission power; the FAP-gateway, which has the ability to support or perform user authentication, after an inadmissible visiting UE performs location update or handoff process to the closed FAP, estimates the probable existence of the deadzone. And a series of procedures that repeatedly decreases the FAP transmission power while the inadmissible visiting UE approaches the above-mentioned deadzone, allowing the inadmissible visiting UE to receive the signals and messages from the UMTS network, until the pre-configured minimum transmission power is reached.

In another exemplary embodiment of the present disclosure, the disclosed relates to a Femtocell network system, co-existing with a UMTS network in a mobile communication environment. The Femtocell network system may comprise a plurality of FAPs, with each FAP having a pre-configured minimum transmission power, and a FAP-gateway. When an inadmissible visiting user equipment (UE) performs location update or handoff procedure to a closed FAP, UE authentication is performed through or by a FAP-gateway, consequently estimates the probable existence of a deadzone. As the inadmissible visiting UE approaches the deadzone caused by the closed FAP, the transmission power of the closed FAP is decreased repeatedly allowing the inadmissible visiting UE to receive the signals and messages from the UMTS network, until the closed FAP reaches the pre-configured minimum transmission power.

The foregoing and other features, aspects and advantages of the present disclosure will become better understood from

DETAILED DESCRIPTION OF THE EMBODIMENTS

Figure 1:
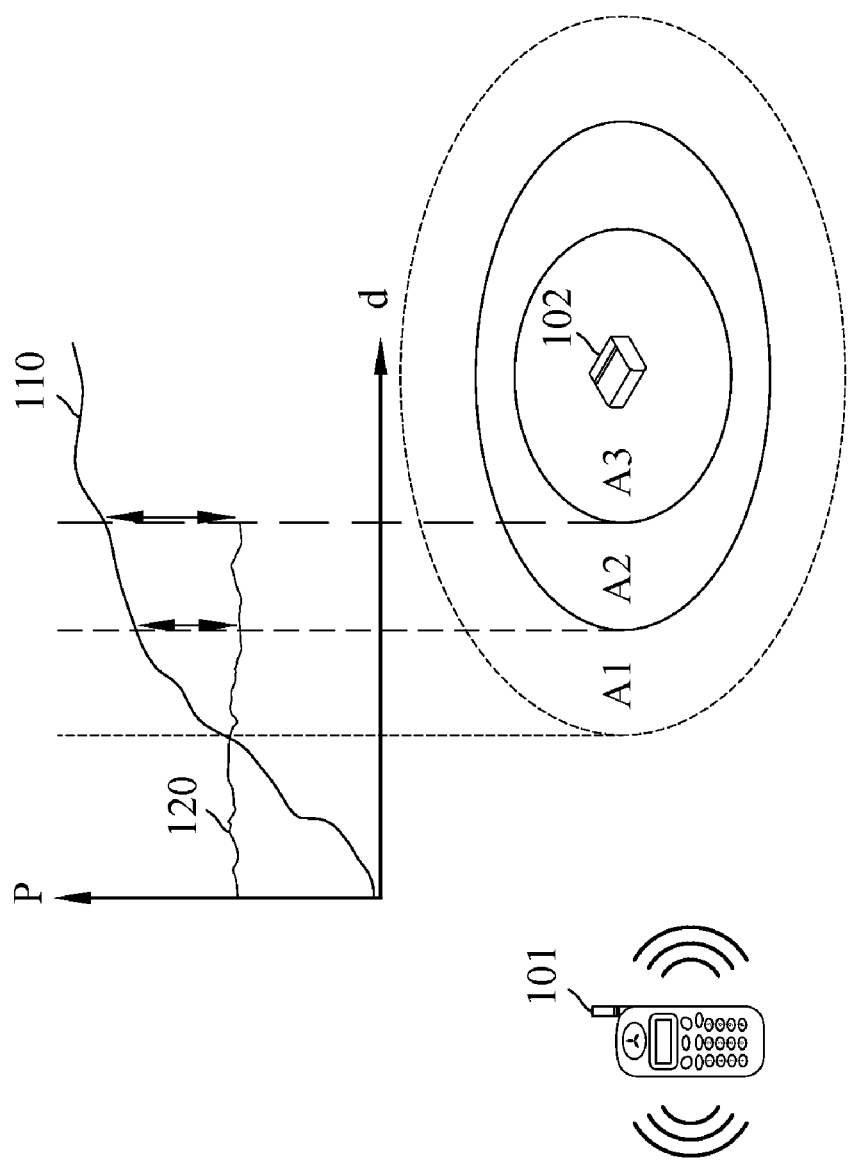
FIG. 1 shows an exemplary schematic view of a FAP deadzone effect.
Figure 2:
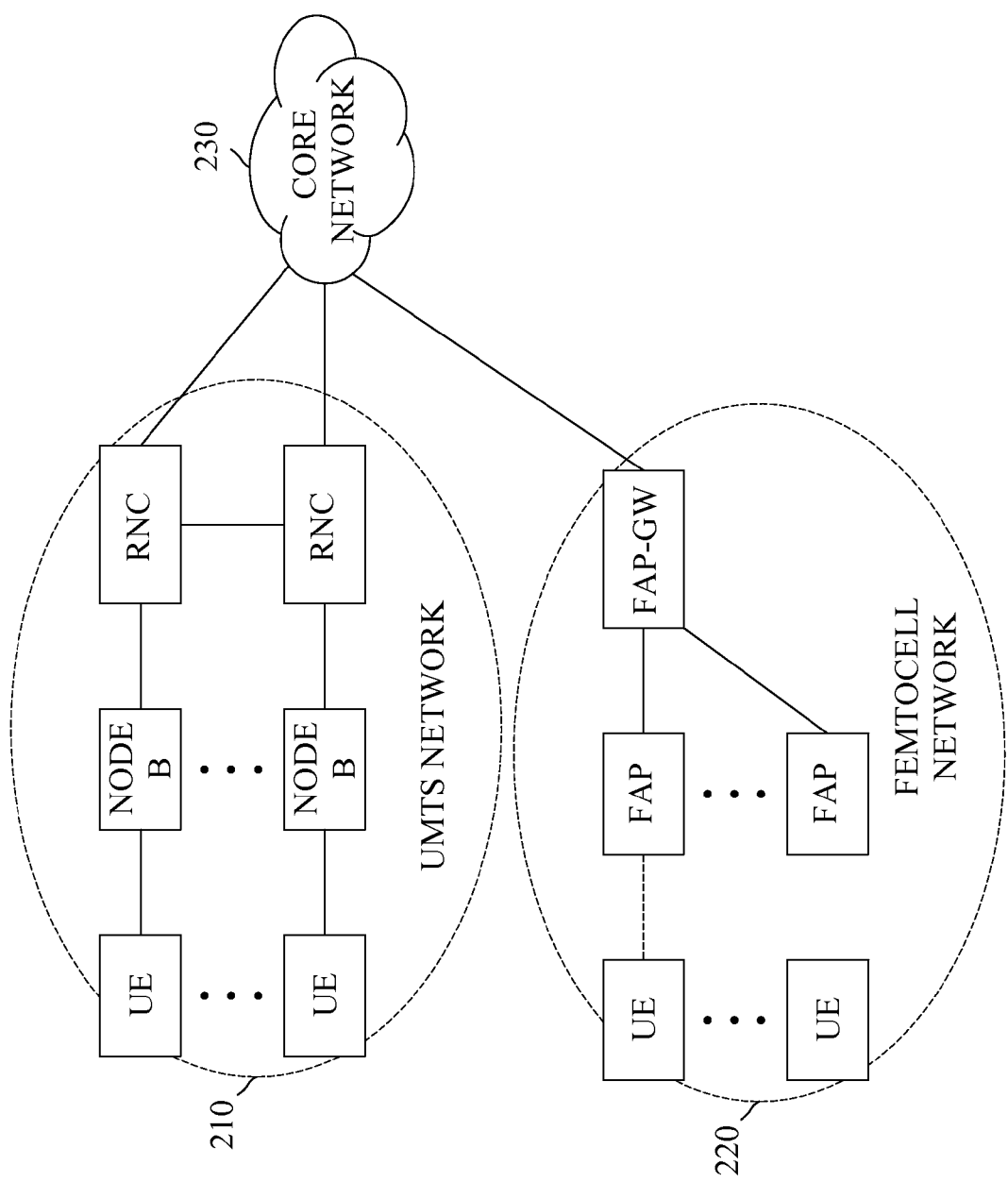
FIG. 2 shows an exemplary schematic view of a Femtocell network system co-existent with a UMTS network within a mobile communication environment, consistent with certain disclosed embodiments of the present disclosure.

FIG. 2 shows an exemplary schematic view of a Femtocell network system co-existent with a UMTS network within a mobile communication environment, consistent with certain disclosed embodiments of the present disclosure. In the mobile communication environment, UMTS network 210 includes a plurality of UEs, a plurality of base stations /Node B, and a plurality of radio network controllers (RNC). Femtocell network 220 includes at least a UE, a plurality of FAPs and at least a FAP-gateway (FAP-GW). FAP-GW and RNC may communicate through the core network 230.

Each FAP may allocate the radio side resource, communicate and transmit messages with the UE side, as well as detect other UMTS Node B in the surroundings. Each FAP may also adjust transmission power according to the FAP-GW commands. FAP-GW may supervise FAP, adjust FAP transmission power, allocate communication resource, and authenticate UE and the UE access right to the FAP. UE may periodically detect available base stations, such as UMTS Node B, FAP, GSM base station, and so on, and report to the network system with information related to the detected base stations so that the network system knows the communication quality and environment where the UE is in. The communication between FAP-GW and RNC or UMTS Node B may use the core network for transmitting information, such as, messages or commands.

Figure 3:
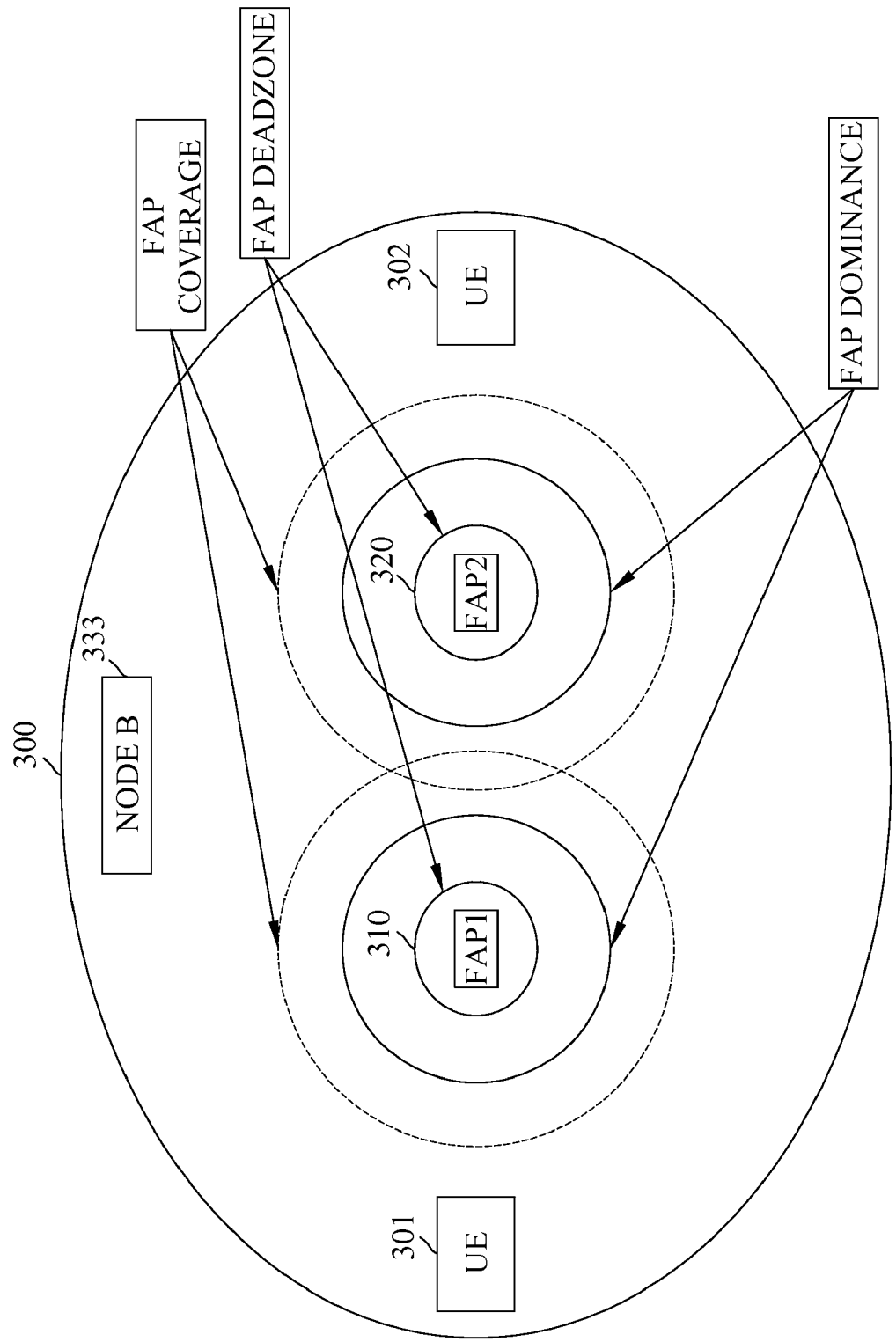
FIG. 3 shows an exemplary schematic view of the coverage of two different FAPs in a mobile communication environment with co-existent UMTS network and Femtocell network systems, consistent with certain disclosed embodiments of the present disclosure.

In the communication environment that Femtocell and UMTS networks co-exists, as shown in FIG. 3, there are two different FAPs, FAP1 and FAP2, within the coverage 300 of UMTS Node B 333. If FAP1 and FAP2 are both closed FAP; in other words, only admissible users are allowed to access the FAP, for example, admissible user of FAP1 is UE 301 and admissible user for FAP2 is UE 302, both UE 301 and UE 302 are users of UMTS network too. For UE 301, Femtocell deadzone exists within FAP2 coverage, i.e., deadzone 320 caused by FAP2. In other words, when UE 301 enters deadzone 320, UE 301 cannot detect or receive signal of UMTS Node B. Similarly, for UE 302, Femtocell deadzone exists within FAP1 coverage, i.e., deadzone 310 caused by FAP1.

According to the communication protocol, before the UE uses a base station for transmitting and receiving messages, the UE must perform a location update process to obtain the access right of the base station. If the UE is in the process of communication and crosses to a different base station coverage area, the UE must perform a handoff process to obtain the communication resource of the new base station and release the communication resource of the previous base station.

Through the location update or handoff process performed by UE to FAP, the disclosed embodiments enable the Femtocell network system to estimate the probable existence of a deadzone when an inadmissible visiting UE approaches to a closed FAP, and design an automatic control process so that the FAP causing the deadzone may dynamically decrease the transmission power to alleviate the Femtocell deadzone effect to allow the UE use UMTS network service.

Therefore, the disclosed exemplary embodiments pre-configure a minimum transmission power and a maximum transmission power for each FAP. The minimum transmission power guarantees the minimum FAP coverage for the admissible UEs of the FAP, and the maximum transmission power is to avoid interfering with the communication quality of other UEs and other base stations, including FAPs and UMTS Node Bs. In this manner, the UMTS users, other FAPs and other FAP UEs will not be affected by the signals from the newly installed FAP. Therefore, after FAP is installed, FAP will perform an auto-configuration process to adjust the power within the range of the minimum and the maximum transmission powers.

Figure 4:
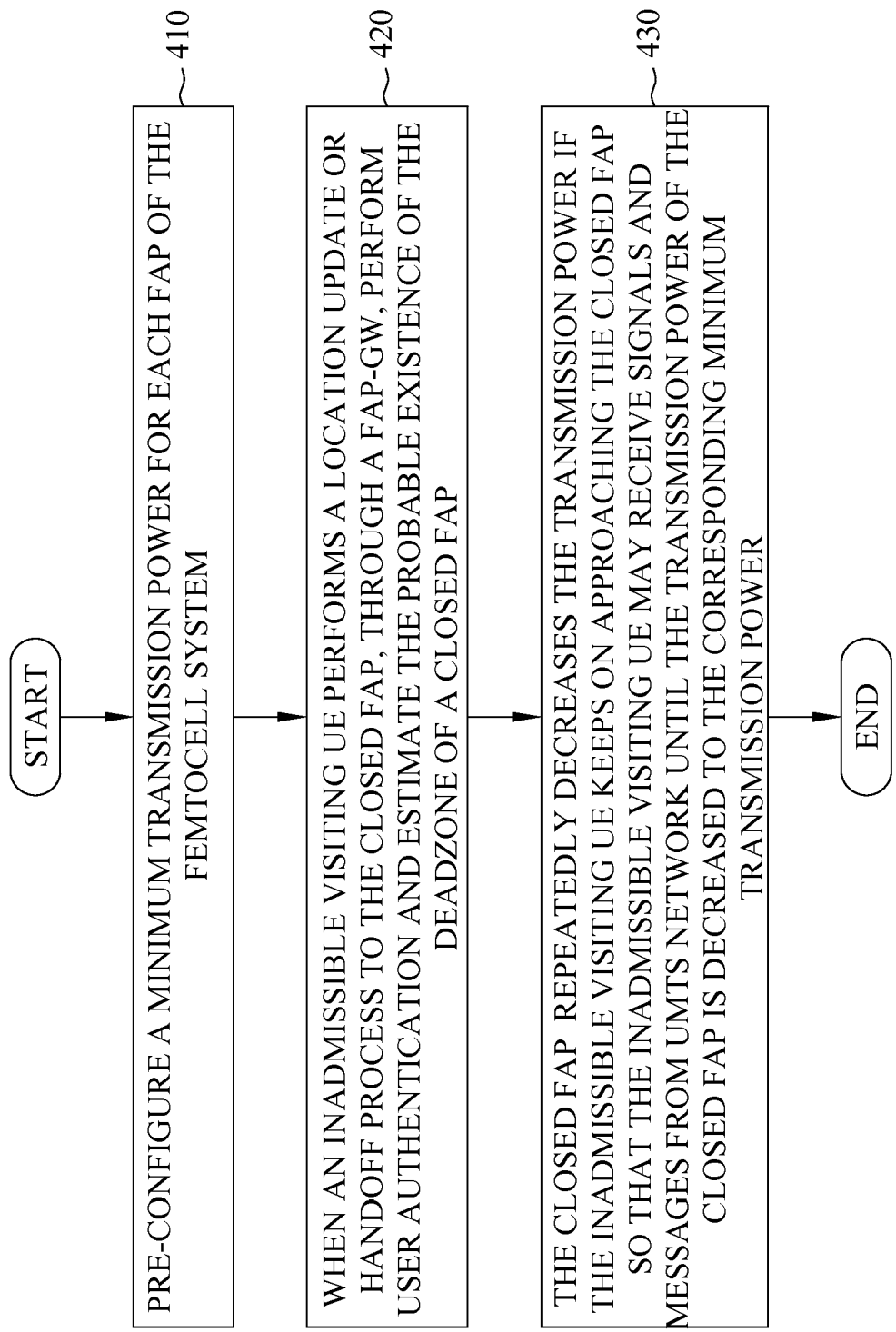
FIG. 4 shows an exemplary schematic view of a method for alleviating deadzone effect of a Femtocell network system, consistent with certain disclosed embodiments of the present disclosure.

FIG. 4 shows an exemplary schematic view of a method for alleviating deadzone effect of Femtocell network system, consistent with certain disclosed embodiments of the present disclosure. In FIG. 4, a minimum transmission power for each FAP of the Femtocell network system is pre-configured, as shown in step 410. When an inadmissible visiting UE performs a location update or handoff process to the closed FAP, FAP-GW may perform user authentication and estimate the possible existence of the deadzone of a closed FAP, as shown in step 420. In step 430, the closed FAP repeatedly decreases the transmission power as the inadmissible visiting UE approaches to the closed FAP so that the inadmissible visiting UE may receive signals and messages from UMTS network until the transmission power of the closed FAP is decreased to the corresponding minimum transmission power.

The following describes the procedure of an admissible UE or an inadmissible visiting UE obtaining FAP access right through a location update or a handoff process.

Figure 5:
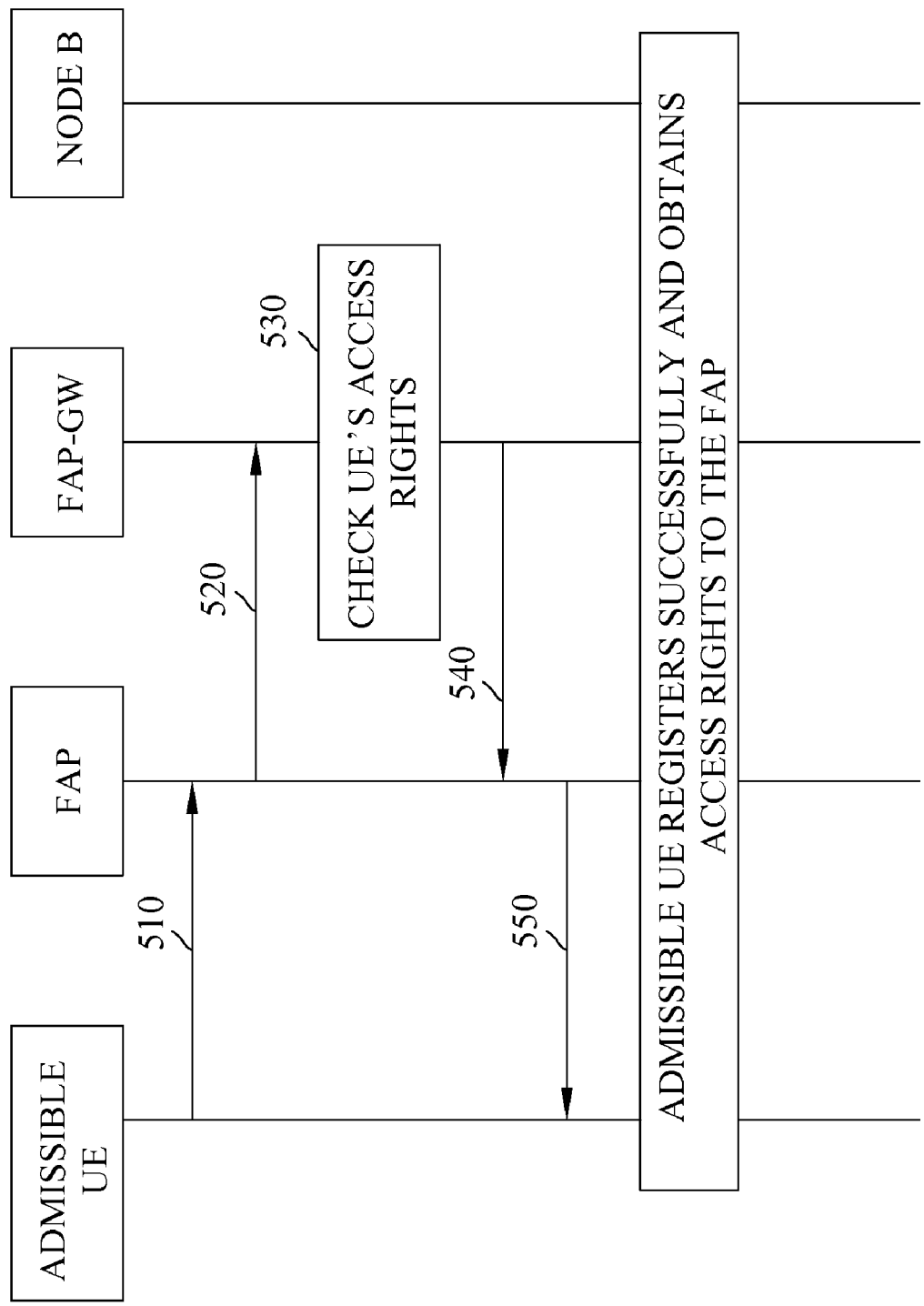
FIG. 5 shows an exemplary schematic view of an admissible user using a location update process to obtain access right to a FAP, consistent with certain disclosed embodiments of the present disclosure.

FIG. 5 shows an exemplary schematic view of an admissible user initiating a location update process to obtain the access right of a FAP, consistent with certain disclosed embodiments of the present disclosure. Referring to FIG. 5, when an admissible UE which is not in the communication process enters the FAP coverage, the UE issues a location update request to the FAP to obtain the access right of the FAP. For example, the admissible UE may issue a location update message, marked as 510, to the FAP. The location update message includes identity information of the admissible UE. The FAP sends the identity information of the admissible UE and its own identity information with the location update request, i.e., the location update message, to FAP-GW, marked as 520, for authenticating and authorizing the UE. The FAP-GW checks the access right of the UE to the FAP, marked as 530, and returns a reply message to admit the request, i.e., a location update reply message, to the FAP, marked as 540. The FAP sends a reply message to admit the access of the admissible UE, marked as 550. In this manner, the admissible UE is authenticated successfully and obtains the access right of the FAP.

Figure 6:
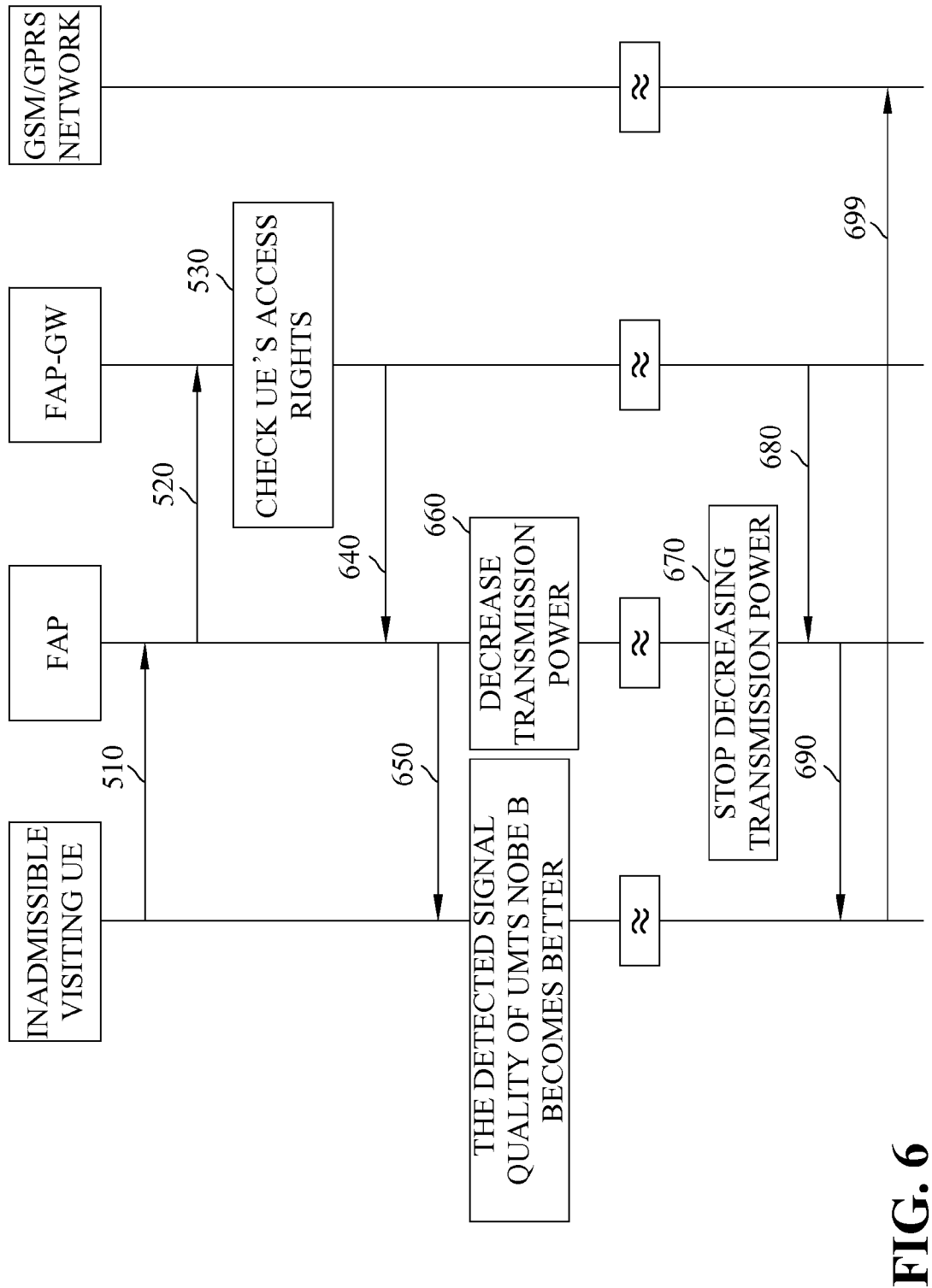
FIG. 6 shows an exemplary schematic view of an inadmissible visiting UE trying to obtain access right to a FAP through location update process, consistent with certain disclosed embodiments of the present disclosure.

FIG. 6 shows an exemplary schematic view of an inadmissible visiting UE trying to obtain the access right to a FAP through a location update process, consistent with certain disclosed embodiments of the present disclosure. Referring to FIG. 6, when an inadmissible visiting UE which is not in the communication process currently enters the FAP coverage, and performs the steps marked 510, 520, 530 of FIG. 5, a FAP-GW learns that the UE is not an admissible UE and replies with a location update denial message, i.e., location update reject message, to the FAP, marked as 640 to deny the location update of the UE. The cause given for the denial message shall avoid "relocation target not allowed" in order to receive succeeding messages from the UE. FAP sends the location update denial message to the inadmissible visiting UE, marked as 650, to deny the location update request of the UE, and the cause given for the denial message shall avoid "relocation target not allowed".

As shown in step 430 of FIG. 4, the disclosed exemplary embodiment repeatedly decreases the transmission power of a closed FAP when an inadmissible visiting UE keeps on approaching the closed FAP so that the interference from the FAP will be reduced and the inadmissible visiting UE may receive the signals and messages from UMTS Node B until the transmission power of the closed FAP reaches the threshold of corresponding minimum transmission power.

Therefore, in the exemplary embodiment of FIG. 6, once the FAP receives the location update denial message from the FAP-GW, the FAP decreases the transmission power, marked as 660. When the FAP decreases transmission power, the impact on the interference of UMTS Node B signal transmission is also decreased and the deadzone effect is relieved as well. Due to the decrease of FAP transmission power, the inadmissible visiting UE may detect that the signal quality of UMTS Node B becomes better. If the inadmissible visiting UE keeps on approaching the deadzone, and detects that the signal quality of the UMTS Node B becomes poor again, the location update process is re-executed and therefore triggers the FAP to decrease the transmission power again (i.e., step marked as 660).

When the transmission power of the FAP is decreased to the threshold of the minimum transmission power, the FAP must stop decreasing transmission power further, marked as 670. If the FAP receives a location update denial message, marked as 680, from FAP-GW, the FAP sends a location update denial message, marked as 690, to the inadmissible visiting UE with the reason "relocation target not allowed", to point out that the inadmissible visiting UE has no access right to the FAP. Meanwhile, the FAP may re-direct the inadmissible visiting UE to another mobile communication system or communication service network, such as, GSM or General Packet Radio Service (GPRS). The inadmissible visiting UE may send a location update message to the GSM/GPRS network, marked as 699, to initiate a location update process to the next suitable base station.

Figure 7:
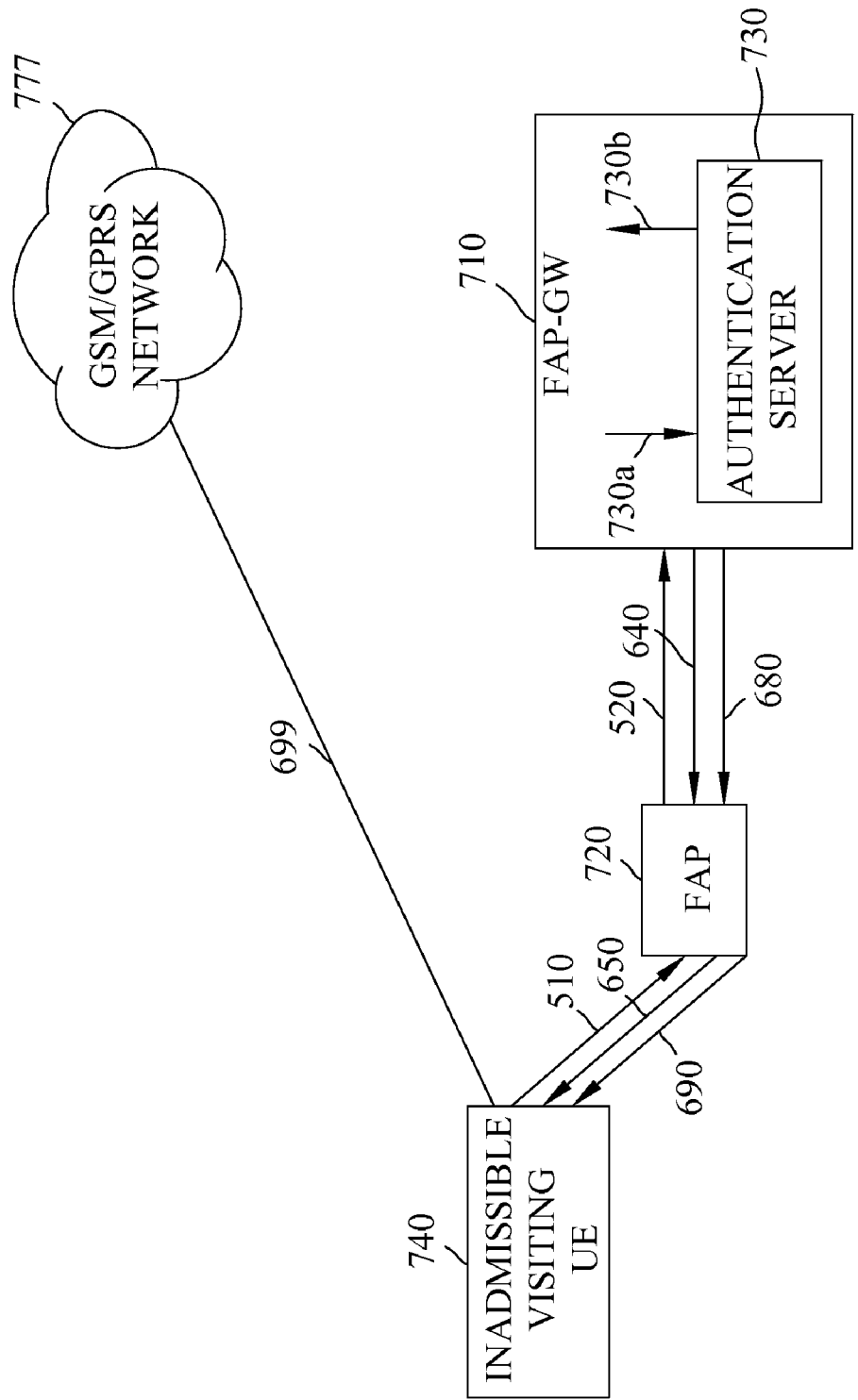
FIG. 7 shows an exemplary schematic view of the interaction among authentication server, FAP, and FAP-GW, in combination with FIG. 6, consistent with certain disclosed embodiments of the present disclosure.

In the exemplary embodiments of FIG. 5 and FIG. 6, FAP-GW may further include an authentication server for executing the step marked as 530, i.e., further check the access right of a UE to a FAP. In combination with FIG. 6, FIG. 7 shows the relation among authentication server, FAP, and FAP-GW, consistent with certain disclosed embodiments of the present disclosure. As shown in FIG. 7, FAP-GW 710 may send a query to an authentication server 730, through a mutual authentication procedure (marked as 730a and 730b) to check whether UE 740 has the access right to access FAP 720. When FAP-GW 710 learns that the UE is an inadmissible user, a location update denial message is replied to FAP 720, marked as 640. FAP 720 sends the location update denial message to the inadmissible visiting UE 740, marked as 650, to deny the request of location update from UE 740, and the cause given for the denial message shall avoid "relocation target not allowed". When the inadmissible visiting UE 740 keeps on approaching FAP 720, FAP 720 repeatedly executes the process to decrease the transmission power, i.e., the step marked 660 in FIG. 6, until the transmission power of FAP 720 is decreased to the minimum. Then, FAP 720 stops decreasing transmission power, marked as 670 in FIG. 6.

After the steps marked as 680 and 690, when FAP 720 notifies the inadmissible visiting UE 740 that no access rights to FAP 720 is for the inadmissible visiting UE 740, the inadmissible visiting UE 740 may send a location update message to GSM/GPRS network 777, marked as 699.

In the above exemplary embodiments, once a FAP receives the location update denial message from a FAP-GW, the FAP decreases the transmission power automatically. The process of decreasing transmission power may be also triggered or handled by commands from FAP-GW.

Figure 8:
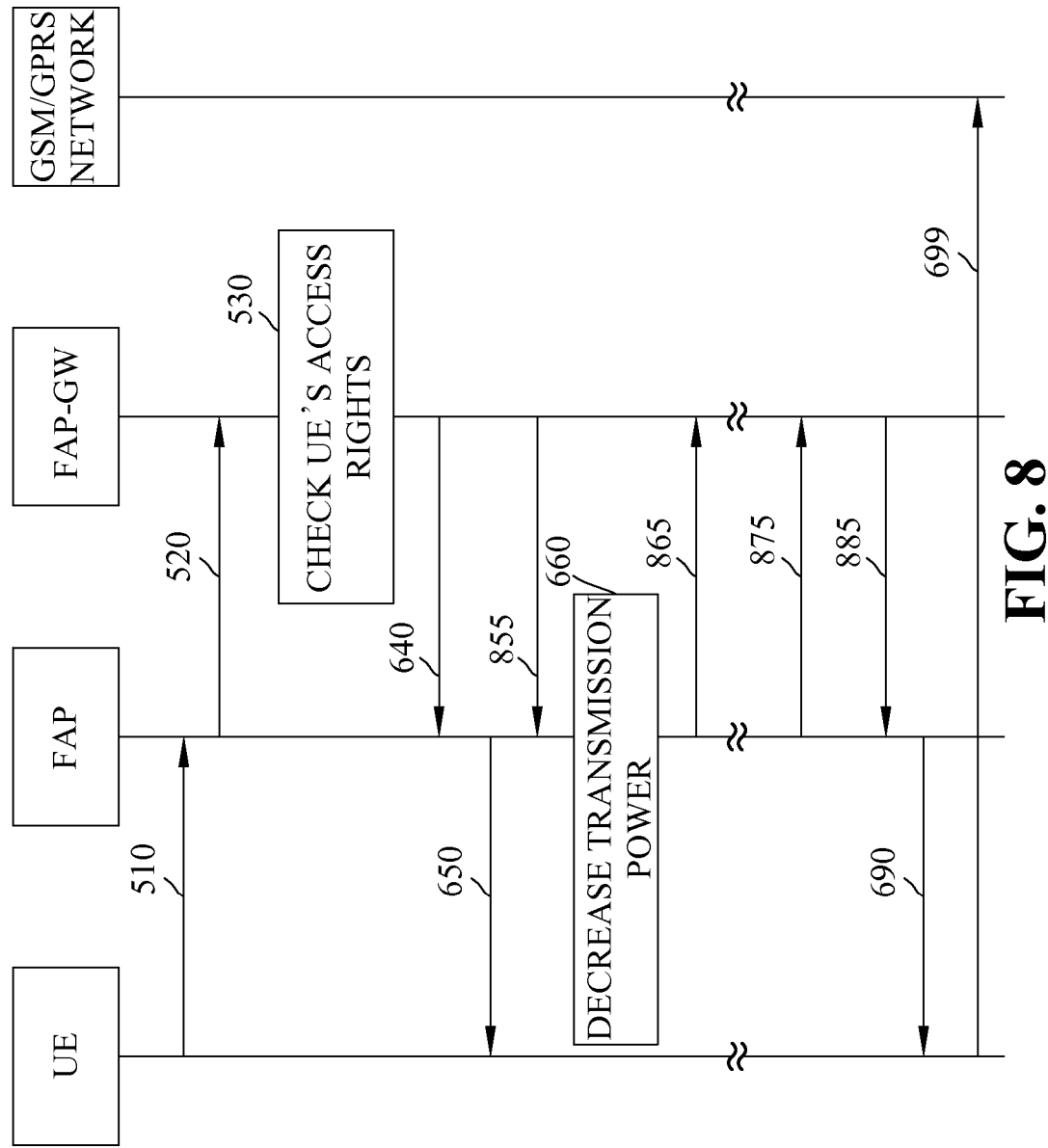
FIG. 8 shows an exemplary working flow of using commands to decrease FAP transmission power and the interaction between FAP and FAP-GW, consistent with certain disclosed embodiments of the present disclosure.

As shown in the exemplary embodiment of FIG. 8, after the FAP-GW replies a location update denial message (marked as 640) to the FAP, the FAP-GW sends a decrease power request 855 to the FAP to decrease the transmission power of the FAP. The FAP responds with an acknowledgement message 865 to the FAP-GW to notify that the transmission power is successfully decreased. When the transmission power of the FAP is decreased to the threshold of the minimum transmission power, the FAP responds to the FAP-GW with a Nack (non-acknowledgement) message 875 to deny the decrease power request 855 from the FAP-GW. Then, the FAP-GW sends a location update denial message, marked as 885, with the cause that the inadmissible visiting UE has no access rights to the FAP.

As aforementioned, if a UE is in the communication process and crosses over to the coverage of another base station, the UE needs to perform handoff process to obtain the communication resource of the target base station and release the communication resource of the previous base station. When a UE which is in the communication process enters the FAP coverage, FIG. 9 shows an exemplary schematic view of an admissible user performing a handoff process to obtain the access right to a FAP, consistent with certain disclosed embodiments.

Figure 9:
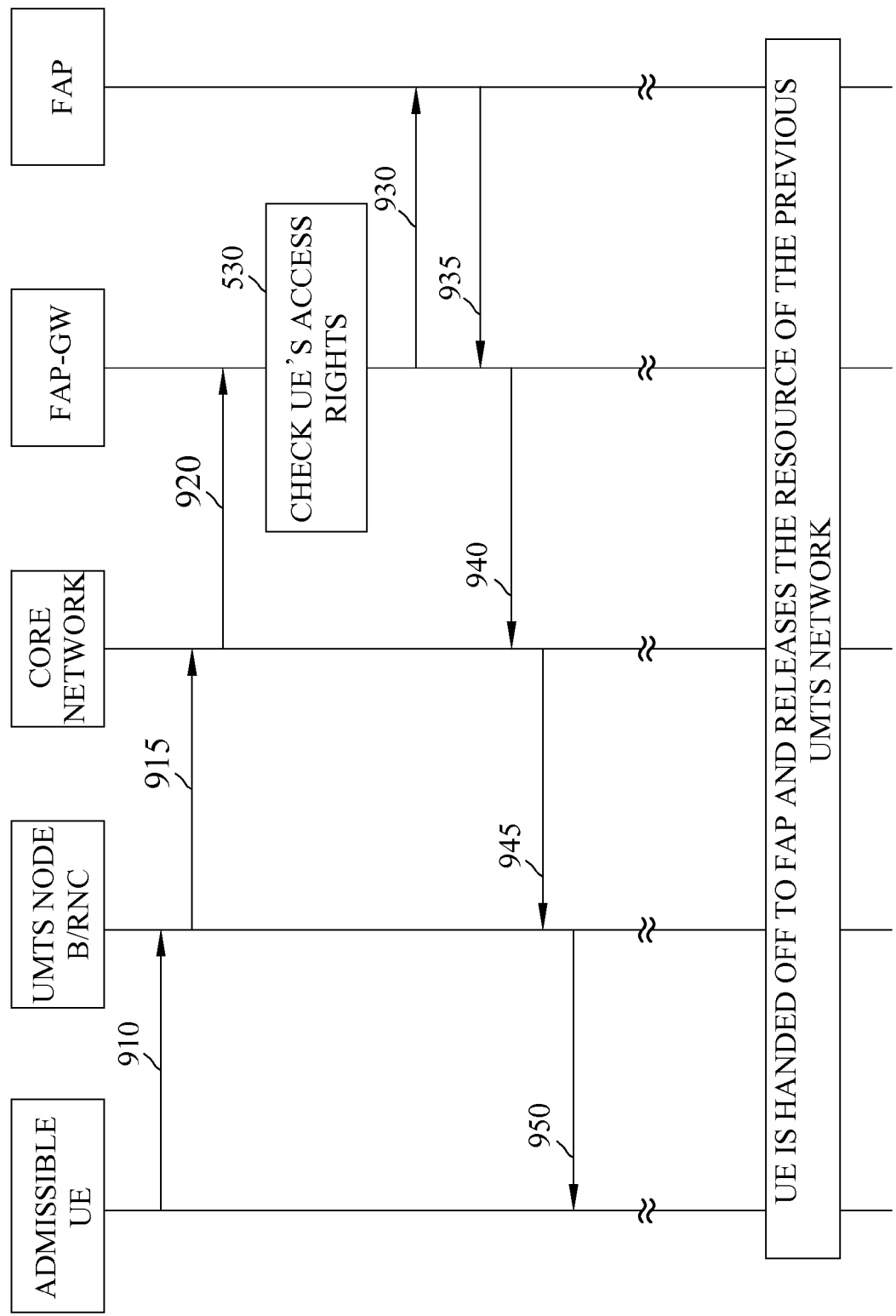
FIG. 9 shows an exemplary schematic view of an admissible user using a handoff process to obtain access rights to a FAP, consistent with certain disclosed embodiments of the present disclosure.

In FIG. 9, mark 910 shows a UE sending the measurement report to the UMTS network. Mark 915 shows the UMTS Node B/RNC sends a message to the core network stating the necessity to handoff the UE to a FAP. Mark 920 shows the core network sending the handoff request message to the FAP-GW. Mark 530 is, as previously explained, for the FAP-GW to check the access rights of the UE to the FAP. Mark 930 shows the FAP-GW, after checking, sending the handoff request to the FAP. Mark 935 shows the FAP sending a handoff acknowledgement message to the FAP-GW. Mark 940 shows the FAP-GW sends a handoff acknowledgement message to the core network. Mark 945 shows the core network sending a handoff command to the UMTS Node B/RNC. Mark 950 shows the UMTS Node B/RNC sending the handoff command to command UE to handoff to the FAP. After that, the UE may successfully handoff to the FAP and release the resource of the previous UMTS network.

In other words, when a UE that is in the communication process enters the coverage of a FAP, the UMTS Node B/RNC determines, according to the measurement report issued by the UE, that the UE shall be handed off to the FAP to maintain the communication. UMTS Node B/RNC sends a handoff request to the FAP-GW to handoff the UE to the FAP through the core network. After the FAP-GW determines the UE as an admissible user, the FAP-GW sends a handoff request to the FAP and replies a handoff acknowledgement message to the UMTS Node B/RNC through the core network so that the UE is successfully handed off to the FAP and the resource of the previous UMTS network can be released successfully.

Figure 10:
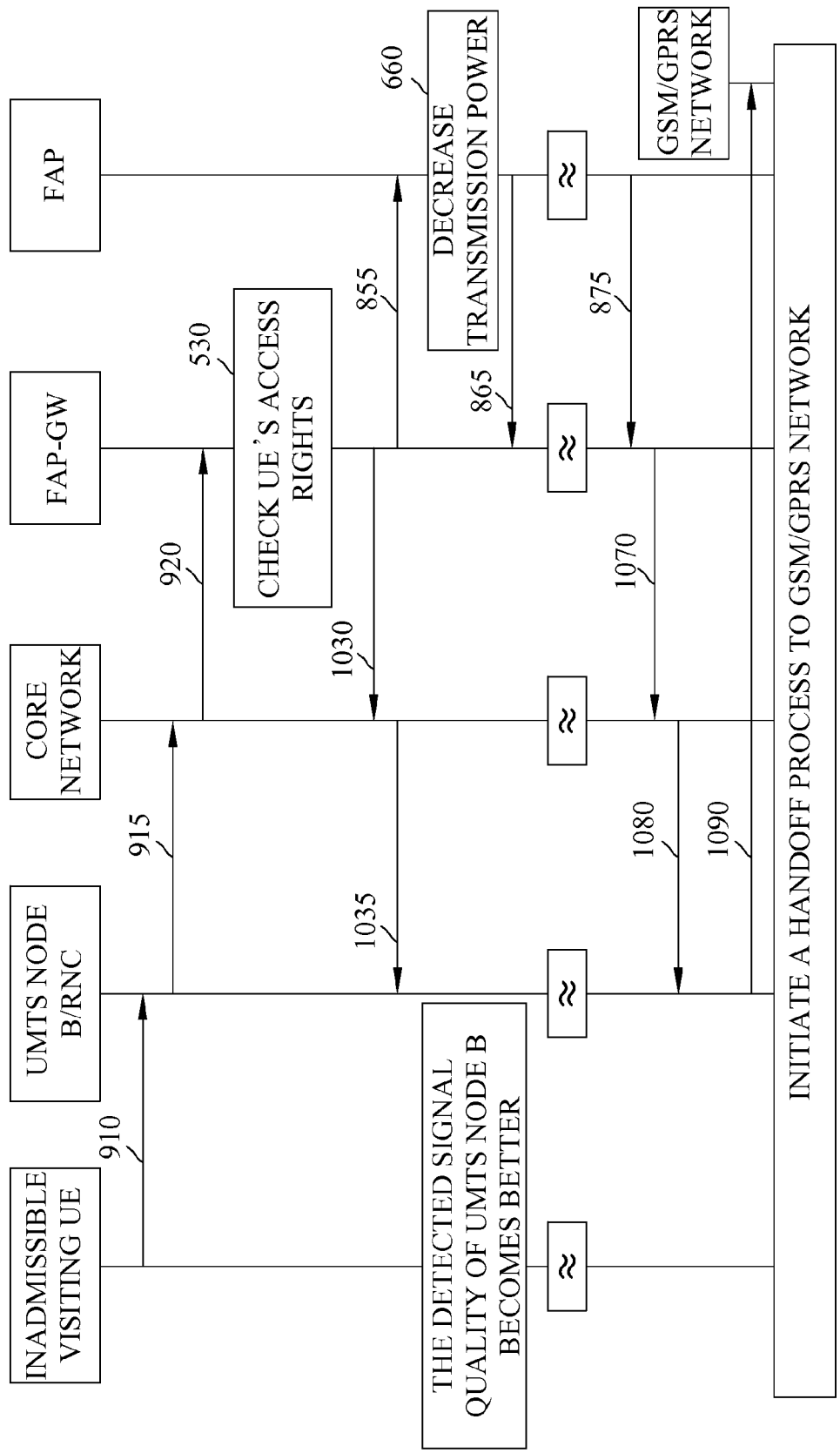
FIG. 10 shows an exemplary schematic view of an inadmissible visiting UE trying to obtain access rights to a FAP via a handoff process, consistent with certain disclosed embodiments of the present disclosure.

FIG. 10 shows an exemplary schematic view of an inadmissible visiting UE trying to obtain access rights to a closed FAP through a handoff process, consistent with certain disclosed embodiments of the present disclosure. Referring to FIG. 10, when an inadmissible visiting UE that is in the communication process enters the FAP coverage and the steps marked as 910, 915, 920 and 530 of FIG. 10 are performed, the FAP-GW learns that the UE is inadmissible. The FAP-GW sends a handoff denial message to the requesting UMTS Node B/RNC through the core network to deny the handoff request, the cause of the denial message shall avoid "relocation target not allowed", where mark 1030 indicates the FAP-GW replies to the core network with a handoff denial message, and mark 1035 indicates the core network sends the handoff denial message to the UMTS Node B/RNC. After sending the handoff denial message 1030, the FAP-GW then sends a decrease power request 855 to the FAP for decreasing the transmission power of the FAP. The FAP decreases the transmission power and responds with an acknowledgement message 865 to the FAP-GW. When the transmission power of the FAP is decreased, the UE will detect that the signal quality of the UMTS network is improved.

If the inadmissible visiting UE keeps on approaching the FAP, the FAP will repeat the process of decreasing transmission power every time the inadmissible UE tries to obtain the access right to the FAP. When the transmission power of the FAP has been decreased to reach the minimum threshold, the FAP will reply a Nack (non-acknowledgement) message 875 to FAP-GW to deny the decrease power request 855 from the FAP-GW. Then, the FAP-GW responds to the core network with a denial message, marked as 1070, to deny the handoff request from the UMTS Node B/RNC, with the denial cause "relocation target not allowed". After the core network receives the denial message from the FAP-GW, the core network responds to the UMTS Node B/RNC with a denial message, marked as 1080, to deny the handoff request from the UMTS Node B/RNC, with the reason "relocation target not allowed". The UMTS Node B/RNC may issue a handoff request message, marked as 1090, to a GSM/GPRS network to initiate the UE handoff process to the GSM/GPRS network.

In other words, when an inadmissible visiting UE that is in the communication process enters the coverage of a closed FAP and the UMTS network determines that the inadmissible visiting UE needs to execute a handoff process to the FAP when the UE approaches the FAP, UMTS network notifies a FAP-GW for the handoff request of the UE from UMTS Node B/RNC to the FAP through the core network. FAP-GW may deny the handoff request from the UMTS network with a specified reason and demands the FAP to decrease the transmission power to prevent the inadmissible visiting UE enters the Femtocell deadzone. The cause adapted to deny the handoff request should avoid "relocation target is not allowed".

Figure 11:
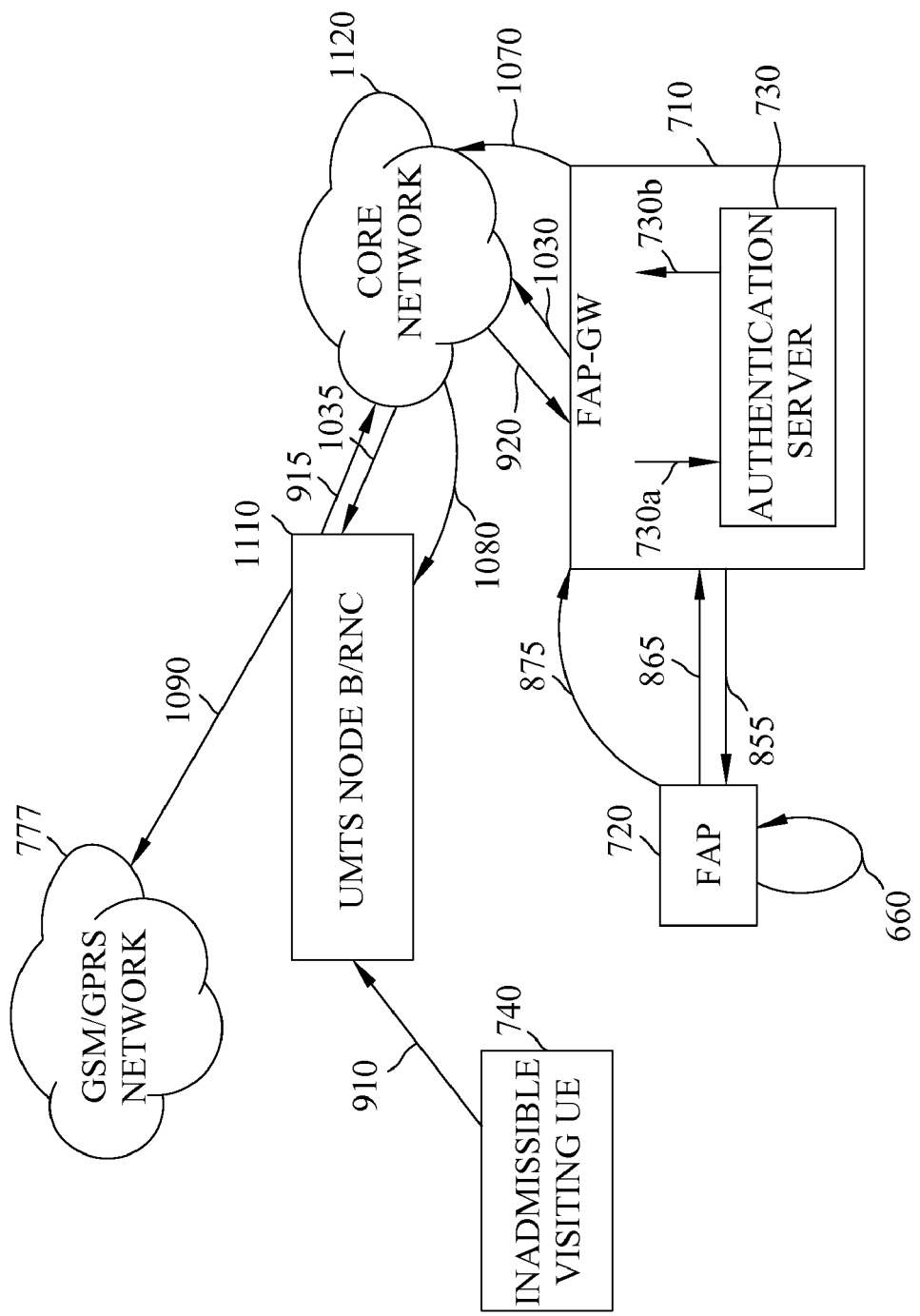
FIG. 11 shows an exemplary schematic view of the interaction among authentication server, FAP, FAP-GW, UMTS Node B/RNC and the core network, in combination with FIG. 10, consistent with certain disclosed embodiments of the present disclosure.

Similarly, in the exemplary embodiments of FIG. 9 and FIG. 10, the FAP-GW may also inquire authentication server 730 through the mutual authentication to check whether the UE has access rights to the FAP. With FIG. 10, FIG. 11 further describes the interaction among the authentication server, FAP, FAP-GW, UMTS Node B/RNC, and the core network, consistent with certain disclosed embodiments of the present disclosure. As shown in FIG. 11, when an inadmissible visiting UE 740 that is in the communication process enters the coverage of FAP 720, UMTS Node B/RNC 1110 determines to hand off the UE to FAP 720 according to the signal measurement result reported from UE 740 to continue the communication. Therefore, UMTS Node B/RNC 1110 sends a handoff request to FAP-GW 710 through the core network 1120 to hand off UE 740 to FAP 720. FAP-GW 710 inquires to authentication server 730, through mutual authentication (marked as 730a, 730b), to determine UE 740 is not an admissible user of FAP 720.

Then, FAP-GW 710 may respond to core network 1120 with a handoff denial message (marked as 1030), and core network 1120 sends a handoff denial message to UMTS Node B/RNC (marked as 1035). In other words, FAP-GW 710 may send UMTS Node B/RNC 1110 a handoff denial message through the core network 1120. At the same time, FAP-GW 710 will send a decrease power request 855 to FAP 720. FAP 20 responds to FAP-GW 710 with an acknowledgement message 865.

When FAP 720 decreases transmission power, the interference to UMTS Node B will be decreased and the FAP deadzone will be shrunken as well. Therefore, the measurement report sent from UE 740 to UMTS Node B/RNC indicates the signal quality of the UMTS network is improved and the UMTS Node B/RNC determines that UE 740 needs not to handoff. If UE 740 detects the signal quality of UMTS network is poor, the handoff process will be re-executed and FAP 720 will repeat the decrease power process. If the transmission power has been reduced to the minimum threshold, FAP 720 responds to FAP-GW 710 with a Nack (non-acknowledgement) message 875 to deny the decrease power request from FAP-GW 710. At this point, FAP-GW 710 sends a handoff failure message to UMTS Node B/RNC, with the failure cause that the UE has no access rights to the FAP. As marks 1070, 1080 show, FAP-GW 710 responds to the core network with a handoff failure message, and after receiving the handoff failure message, the core network responds to the UMTS Node B/RNC with a handoff failure message.

After UMTS Node B/RNC 1110 receives the handoff failure message, UMTS Node B/RNC 1110 may determine, according to the measurement report from UE 740, to request another suitable base station of GSM/GPRS network 777 for executing a handoff process.

Figure 12:
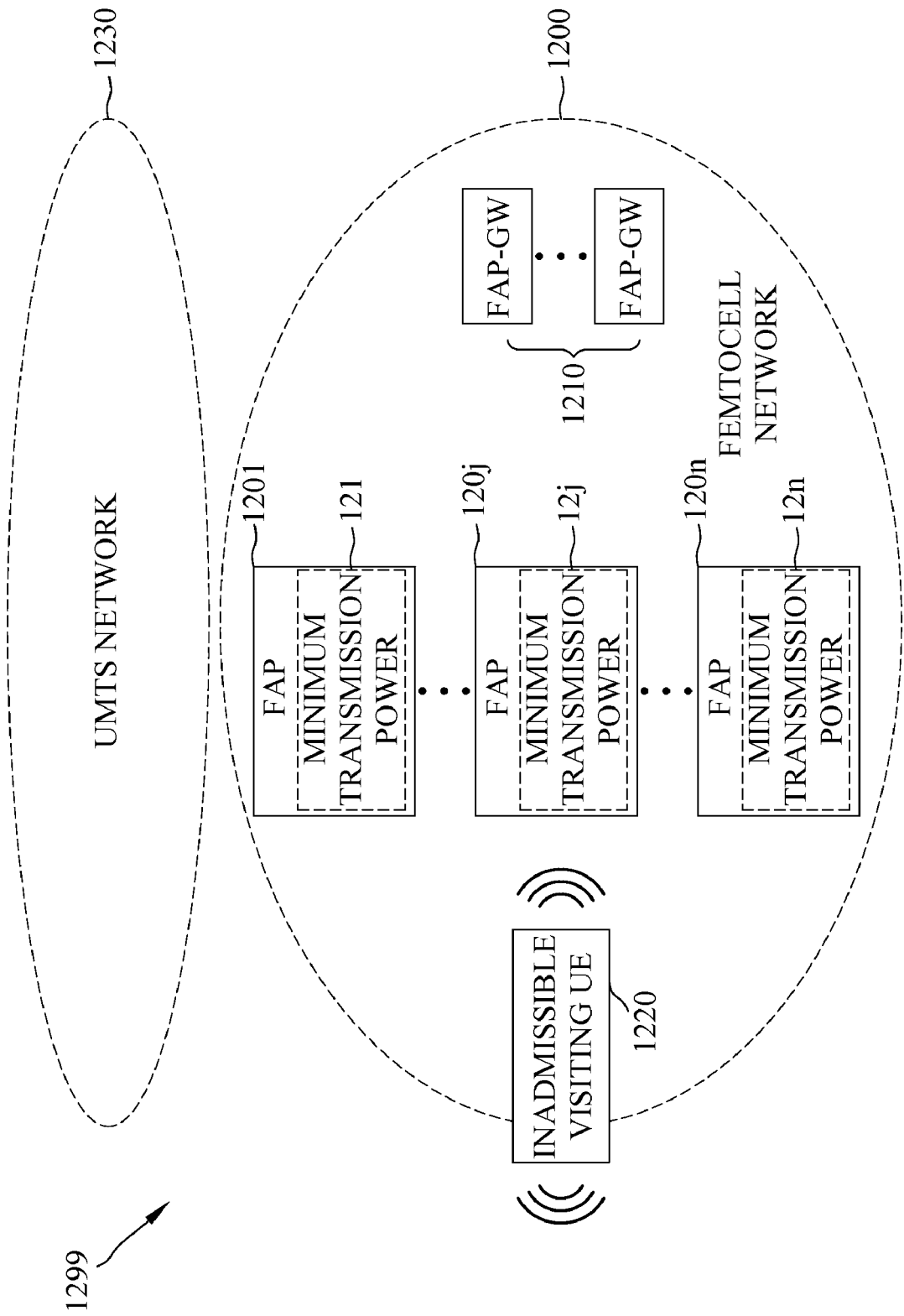
FIG. 12 shows an exemplary schematic view of a Femtocell network system, consistent with certain disclosed embodiments of the present disclosure.

FIG. 12 shows an exemplary schematic view of a Femtocell network, consistent with certain disclosed embodiments of the present disclosure. Referring to FIG. 12, Femtocell network 1200 may comprise a plurality of FAP 1201-120$n$ and at least a FAP-GW 1210, and is co-existent with a UMTS network 1230 in a mobile communication environment 1299. Each FAP 120$i$ of FAPs 1201-120$n$ is pre-configured with a minimum transmission power 12$i$. For an inadmissible visiting UE 1220 trying to obtain an access rights to a closed FAP 120$j$ through a location update or a handoff process, FAP-GW 1210 performs user authentication and estimates the possible existence of the deadzone of closed FAP 120$j$. As UE 1220 approaches the closed FAP 120$j$, the closed FAP 120$j$ repeatedly decreases its transmission power so that UE 1220 may receive better signals and messages from UMTS network 1230 until the closed FAP 120$j$ reaches its minimum transmission power 12$j$, where $1 \leq i, j \leq n$, and n is an integer greater than 1.

Figure 13B:
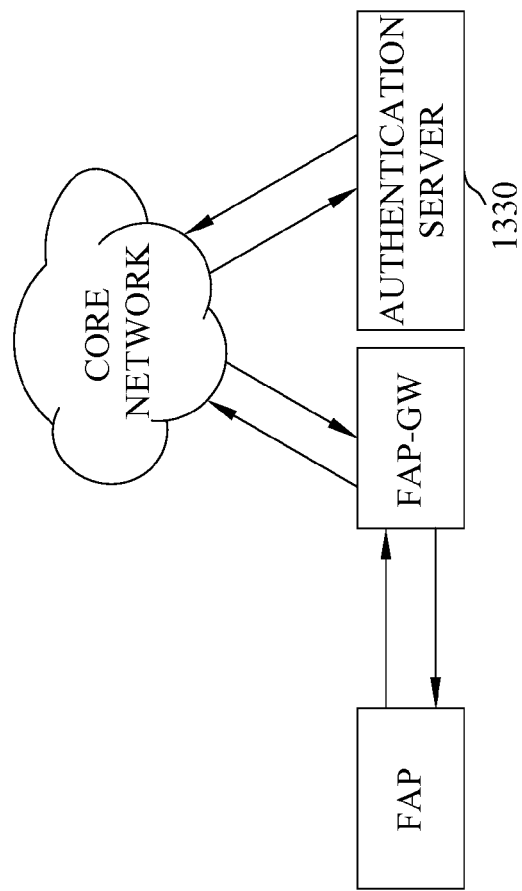
FIG. 13B shows an exemplary schematic view of FAP-GW inquiring to an external authentication server for authenticating user through the core network, consistent with certain disclosed embodiments of the present disclosure.
Figure 13A:
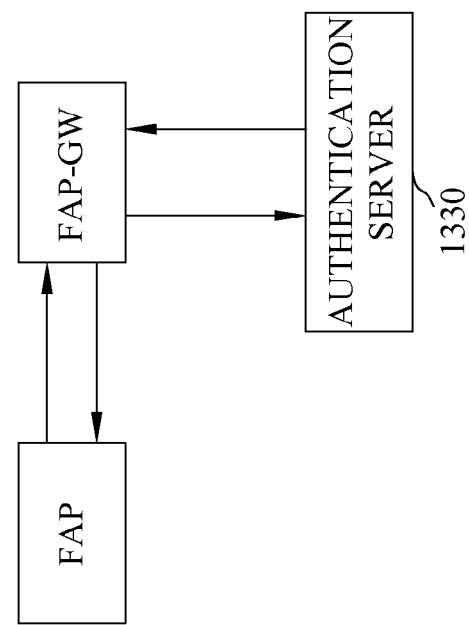
FIG. 13A shows an exemplary schematic view of FAP-GW inquiring to an external authentication server for authenticating user, consistent with certain disclosed embodiments of the present disclosure.

There are many ways to perform user authentication through FAP-GW 1210. For example, aforementioned FIG. 7 and FIG. 11 describe a FAP-GW with functions of authentication server, or FAP-GW inquires to an external authentication server 1330 for mutual authentication, as shown in FIG. 13A. Alternatively, FAP-GW may inquire external authentication server 1330 through the core network for user authentication, as shown in FIG. 13B. In other words, FAP-GW has the capability to determine or may obtain the access rights of a UE to each FAP.

After each FAP is installed at the network where Femtocell network is located, each FAP automatically adjusts to a transmission power falling within the range of a corresponding minimum and a maximum transmission power. During the time that a FAP is functioning, each FAP may adjust its transmission power dynamically. For example, a FAP with the pre-configured minimum and maximum transmission power is turned on. A FAP scans and measures the detected cell signal strength, then reports this information to FAP-GW 1210 periodically or in real-time. FAP-GW 1210 may maintain a neighboring graph for each FAP to establish/update the information of signal strength on the neighboring cells to compute the suitable downlink power for each FAP and estimates the FAP coverage accordingly. In this manner, each FAP may use the calculated transmission power to transmit the signals and messages to the UEs within the coverage of the FAP. FAP-GW 1210 may store or obtain the information on the neighboring cells of each FAP, including the information of other FAP or UMTS Node B, and information of other communication systems, like GSM/GPRS base station.

As aforementioned, through the UE executing a location update or a handoff process to the FAP and the FAP-GW executing authentication process to the UE, once the FAP learns from the FAP-GW replied deny message that the UE is an inadmissible visiting UE, the transmission power of the closed FAP may be decreased at the request of FAP-GW or by FAP automatically.

Therefore, when inadmissible visiting UE 1220 executes a location update or a handoff process to FAP 120$j$, FAP-GW 1210 may, through the authentication of the UE regarding the access rights to a FAP, deny the request of inadmissible visiting UE 1220 and command the FAP 120$j$ to decrease the transmission power to avoid UE 1220 entering Femtocell deadzone. The cause for denial should avoid "relocation target not allowed". Or, when FAP 120$j$ receives a deny message with the cause "relocation target not allowed" from FAP-GW 1210, FAP 120$j$ itself decreases transmission power to avoid UE 1220 entering Femtocell deadzone.

In summary, the disclosed exemplary embodiments provides a Femtocell network system having a plurality of FAPs and at least a FAP-GW, and coexistent with a UMTS network in a mobile communication environment. The method for alleviating deadzone effect is to pre-configure a minimum transmission power for each FAP in the Femtocell network system. When an inadmissible visiting UE executes a location update or a handoff process to a closed FAP, the possible existence of a deadzone may be estimated when the inadmissible visiting UE approaches the deadzone of the closed FAP. A mechanism for decreasing the transmission power of the closed FAP is also provided so that the FAP causing the deadzone will repeatedly decrease the transmission power to reduce the deadzone scope.

Although the present disclosure has been described with reference to the exemplary embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A method for alleviating deadzone effect of a Femtocell network system, said Femtocell network system comprising a plurality of femto access points (FAPs) and at least a FAP-gateway (FAP-GW), and being co-existent with a universal mobile telecommunication system (UMTS) network in a mobile communication environment; said method comprising:

pre-configuring a minimum transmission power for each of said plurality of FAPs;

when an inadmissible visiting user equipment (UE) executes a location update or a handoff process to a closed FAP, said at least a FAP-GW performing user authentication and estimating probable existence of a deadzone of said closed FAP; and before said inadmissible visiting UE reaches said deadzone of said closed FAP, repeatedly decreasing transmission power of said closed FAP so as to allow said inadmissible visiting UE to receive signals and messages from said UMTS network until said transmission power of said closed FAP reaches said minimum transmission power corresponding to said closed FAP.

2. The method as claimed in claim 1, said method pre-configures a maximum transmission power for each of said plurality of FAPs to avoid interfering with communication quality between other UEs and each of said plurality of FAPs, and to avoid interfering with communication quality between other FAPs and a UMTS base station.

3. The method as claimed in claim 1, wherein said minimum transmission power of each of said plurality of FAPs guarantees minimum FAP communication coverage for all admissible UEs of the FAP.

4. The method as claimed in claim 1, wherein after each of said plurality of FAPs is installed to said Femtocell network system, the FAP executes auto-configuration to adjust transmission power to a suitable value falling within a range of said minimum transmission power and a maximum transmission power corresponding to the FAP.

5. The method as claimed in claim 1, wherein for said inadmissible visiting UE trying to obtain access right to a closed FAP using a location update process, before said at least a FAP-GW performs user authentication, said method further includes:
said inadmissible visiting UE issuing a location update message to said closed FAP; and
said closed FAP transmitting said location update message with identity information of said closed FAP to said at least a FAP-GW for user authentication.

6. The method as claimed in claim 5, wherein after said FAP-GW performs user authentication, said method further includes:
said at least a FAP-GW responding a location update denial message to said closed FAP; and
said closed FAP sending said location update denial message to said inadmissible visiting UE.

7. The method as claimed in claim 6, wherein when said closed FAP decreases said transmission power to said minimum transmission power, said method further includes:
said closed FAP stopping decreasing transmission power;
said at least a FAP-GW sending another location update denial message to said closed FAP;
said closed FAP sending said another location update denial message to said inadmissible visiting UE to point out that said inadmissible visiting UE has no access right to said closed FAP.

8. The method as claimed in claim 7, wherein after said inadmissible visiting UE is pointed out for not having access right to said closed FAP, said closed FAP re-directs said inadmissible visiting UE to another network to search for another suitable base station to initiate another location update process.

9. The method as claimed in claim 1, wherein for said inadmissible visiting UE trying to obtain the access right to said closed FAP via said handoff process, before said at least a FAP-GW performs user authentication, said method further includes:
said inadmissible visiting UE issuing a signal measurement report to a radio network controller (RNC) of said UMTS network;
said RNC sending a request message to a core network to handoff said inadmissible visiting UE to said closed FAP; and
said core network transmitting said handoff request message to said at least a FAP-GW.

10. The method as claimed in claim 9, wherein after said at least a FAP-GW performs user authentication, said method further includes:
through transfer by said core network, responding a handoff failure message at said closed FAP to said RNC.

11. The method as claimed in claim 10, wherein when said closed FAP decreases said transmission power to said minimum transmission power, said method further includes:
said closed FAP responding a Nack message of the request of decrease power to said at least a FAP-GW;
said FAP-GW responding to said core network with a handoff failure message; and
said core network responding to said RNC with a handoff failure message to point out that said inadmissible visiting UE has no access right to said closed FAP.

12. The method as claimed in claim 1, wherein said at least a FAP-GW inquires to an authentication server for performing authentication on said inadmissible visiting UE.

13. The method as claimed in claim 11, wherein after said inadmissible visiting UE is pointed out having no access right to said closed FAP, said closed FAP re-directs said inadmissible visiting UE to another network for another suitable base station to initiate another handoff process.

14. A Femtocell network system, co-existent with a universal mobile telecommunication system (UMTS) network in a mobile communication environment, said Femtocell network system comprising:
a plurality of femto access points (FAPs), each of said plurality of FAPs being configured with a minimum transmission power; and
at least a FAP-gateway (FAP-GW), wherein when an inadmissible visiting user equipment (UE) executes a location update or a handoff process to a closed FAP, said at least a FAP-GW performing user authentication to estimate probable existence of a deadzone of said closed FAP;
wherein before said inadmissible visiting UE reaches said deadzone of said closed FAP, said transmission power of said closed FAP repeatedly decreases to allow said inadmissible visiting UE to receive signals and messages from said UMTS network until said closed FAP reaches said minimum transmission power.

15. The system as claimed in claim 14, wherein said at least a FAP-GW inquires to an external authentication server for performing user authentication.

16. The system as claimed in claim 14, wherein said at least a FAP-GW uses a core network to inquire to an external authentication server for performing user authentication.

17. The system as claimed in claim 14, wherein said at least a FAP-GW further includes functions of an authentication server.

18. The system as claimed in claim 14, wherein each of said plurality of FAPs is pre-configured with a maximum transmission power to avoid interfering with communication quality between other UEs and each of said plurality of FAPs, and to avoid interfering with communication quality between other FAPs and a UMTS base station.

19. The system as claimed in claim 14, wherein said repeatedly decreasing transmission power of said closed FAP is performed by said at least a FAP-GW sending said closed FAP a decrease power request command, or by said closed FAP automatically decreasing transmission power.

20. The system as claimed in claim 18, wherein after each of said plurality of FAPs is installed to said Femtocell network system, the FAP executes auto-configuration to adjust transmission power to a suitable value falling within a range of said minimum transmission power and said maximum transmission power corresponding to the FAP.

21. The system as claimed in claim 18, wherein each of said plurality of FAPs, after being activated, pre-configures said minimum and maximum transmission powers, and then scans and measures detected cell signal strength and reports to said at least a FAP-GW.

22. The system as claimed in claim 14, wherein said FAP-GW maintains a neighboring graph for each of said plurality of FAPs to establish or update signal strength information on neighboring cells of the FAP to compute downlink transmission power of the FAP.

23. The system as claimed in claim 14, wherein said FAP-GW stores information of neighboring cells of each of said plurality of FAPs, or has a function to obtain information of said neighboring cells.

24. The system as claimed in claim 23, wherein said information of said neighboring cells is chosen from a group consisting of information of other FAPs, information of at least a base station of said UMTS network, and information of at least a base station of a Global System for Mobile Communications or a General Packet Radio Service system.

* * * * *